(12) United States Patent
Hamada et al.

(10) Patent No.: US 6,858,329 B2
(45) Date of Patent: Feb. 22, 2005

(54) MASTER DISC AND METHOD FOR MANUFACTURING MAGNETIC DISC USING THE SAME

(75) Inventors: Taizou Hamada, Osaka (JP); Hideyuki Hashi, Osaka (JP); Tatsuaki Ishida, Shiga (JP); Nobuyuki Komura, Kyoto (JP); Yasuaki Ban, Osaka (JP); Keizo Miyata, Osaka (JP); Kiyokazu Tohma, Osaka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 83 days.

(21) Appl. No.: 09/980,183

(22) PCT Filed: Mar. 29, 2001

(86) PCT No.: PCT/JP01/02696
§ 371 (c)(1),
(2), (4) Date: Apr. 30, 2002

(87) PCT Pub. No.: WO01/75868
PCT Pub. Date: Oct. 11, 2001

(65) Prior Publication Data
US 2002/0150794 A1 Oct. 17, 2002

(30) Foreign Application Priority Data
Mar. 31, 2000 (JP) ........................................ 2000-097309
Apr. 21, 2000 (JP) ........................................ 2000-120771

(51) Int. Cl.[7] ................................................. G11B 5/66
(52) U.S. Cl. ............................... 428/694 SG; 428/692; 428/694 TR; 428/694 TM
(58) Field of Search ........................... 428/692, 694 SG, 428/694 TR, 694 TM, 694 R, 694 ML

(56) References Cited

U.S. PATENT DOCUMENTS

5,800,253 A * 9/1998 Ikemoto ........................ 451/63
6,347,016 B1   2/2002 Ishida et al.

FOREIGN PATENT DOCUMENTS

| EP | 915 456 | 5/1999 |
| JP | 5-81671 | 4/1993 |
| JP | 10-040544 | 2/1998 |

(List continued on next page.)

OTHER PUBLICATIONS

"Head–Positioning Servo Technology for Magnetic Disk Drives", Yamaguchi, T., Journal of Japan Society of Applied Magnetics, vol. 20, No. 3, p. 771, 1996.

(List continued on next page.)

*Primary Examiner*—Deborah Jones
*Assistant Examiner*—Vivek Koppikar
(74) *Attorney, Agent, or Firm*—Merchant & Gould P.C.

(57) ABSTRACT

A master disc capable of conducting a preformat recording by a magnetic transcription without causing any unevenness over an entire magnetic disc is provided. The master disc is provided with a radial land portion where an array of ferromagnetic thin films is formed and a concave portion against the land portion. The land portion and the concave portion are formed such that the land portion is joined with the surface of the magnetic disc when the present magnetic disc is overlapped on the magnetic disc, and that the concave portion is not contacted with the surface of the magnetic disc, and also that a space surrounded by the surface of the magnetic disc and the concave portion is open to air at a peripheral end portion of the magnetic disc.

11 Claims, 19 Drawing Sheets

FOREIGN PATENT DOCUMENTS

| | | |
|---|---|---|
| JP | 10-269566 | 10/1998 |
| JP | 10-275435 | 10/1998 |
| JP | 11-025455 | 1/1999 |
| JP | 11-175973 | 7/1999 |
| JP | 11-273069 | 10/1999 |
| JP | 2000-67433 | 3/2000 |
| JP | 2001-266342 | 9/2001 |

OTHER PUBLICATIONS

"The Status & Future of Mechanical, Servo & HDI Technologies, Materials for the ninety–third Workshop of Japan Society of Applied Magnetics", Uematsu, Y. et al., 93–5, pp. 35, 1996.

* cited by examiner

MASTER DISC AND METHOD FOR MANUFACTURING MAGNETIC DISC USING THE SAME

TECHNICAL FIELD

The present invention relates to a master disc used for transcription of magnetic information in a magnetic disc serving as a slave disc and a magnetic disc manufactured by using this master disc.

BACKGROUND ART

At present, magnetic recording reproduction devices are designed to have higher recording density in order to achieve a large capacity with a small size. In the field of a hard disc drive, which is a typical magnetic recording reproduction device, a device having an areal recording density of more than 3 Gbits/in$^2$ (4.65 Mbits/mm$^2$) is already commercialized, and such a rapid progress in the technology can be observed that a device having a surface recording density of 10 Gbits/in$^2$ (15.5 Mbits/mm$^2$) is anticipated to come into practical use in a few years.

As the technical background for enabling such higher recording density, there are improvements in the performance of a magnetic recording medium and a head-disc interface as well as improvements in the linear recording density achieved by the appearance of a new signal processing mode such as a partial response.

Here, the partial response is a mode of intentionally providing a known intersymbol interference at the time of waveform equalization conducted for avoiding an intersymbol interference when the linear recording density is increased, and this mode is characterized in that the deterioration of a bit error rate can be prevented compared to a conventional peak detection or an integral detection.

In recent years, however, in addition to the appearance of such a signal processing mode, the main factor for improving the surface recording density is that the tendency toward an increase in the track density is significantly exceeding the tendency toward an increase in the linear recording density. This is due to the fact that a magneto-resistive type head, which has excellent reproduction output performance compared to a conventional inductive type magnetic head, has come into practical use. At present, due to the commercialization of the magneto-resistive device type head, a signal with a track width of not more than several $\mu$m can be reproduced at a high S/N ratio. On the other hand, along with a further improvement in the performance of the head in the years to come, a track pitch is expected to reach the submicron range in the near future.

For a magnetic head to scan such narrow tracks accurately and to reproduce signals at a high S/N ratio, the tracking servo technology of the magnetic head plays an important role. As for such tracking servo technology of present hard disc drives, for example, "Yamaguchi: High precision servo technology of a magnetic disc device, Journal of Japan Society of Applied Magnetics, Vol. 20, No. 3, p. 771 (1996)" discloses the content thereof in detail. According to this document, recording tracks are formed in circular manner on a hard disc. And within a revolution of the disc, that is, within an angle of 360 degrees, a single region called a wedge is repeatedly provided at a constant interval, where a servo signal for tracking, an address information signal and a reproduction clock signal etc. are recorded (hereinafter referred to as a "preformat recording area"). With the use thereof, the magnetic head reproduces these signals at a constant interval and identifies its own position, and thus the magnetic head can scan on the tracks accurately while, if necessary, correcting for displacement of the magnetic disc in the radial direction.

Furthermore, since the above-mentioned preformat information signals such as a servo signal for tracking, an address information signal and a reproduction clock signal serve as reference signals for the magnetic head to scan accurately on the tracks, track positioning is required to be performed correctly with precision. For example, according to the content disclosed by "Uematsu, et al.: Mechanical Servo, Present state and outlook of the HDI technology, Materials for the ninety-third Workshop of Japan Society of Applied Magnetics, 93–5, pp. 35 (1996)", in a present hard disc drive, after a magnetic disc and a magnetic head are incorporated into the drive, by using a single-purpose servo track recording device called a servo track writer, the servo signal for tracking, the address information signal and the reproduction clock signal etc. are recorded by the intrinsic magnetic head incorporated inside the drive.

In this case, the preformat recording is performed by precisely controlling the position of the intrinsic magnetic head incorporated inside the drive by an external actuator equipped in the servo tracking recording device so as to achieve the track positioning with the necessary precision.

However, the conventional technology of performing the preformat recording by the intrinsic magnetic head incorporated inside the drive with the single-purpose servo track writer has the following problems.

First, a recording by a magnetic head basically is a linear recording achieved by the relative movement of a magnetic head and a magnetic recording medium, so that the above-mentioned method for performing the recording by precisely controlling the position of the magnetic head with the single-purpose servo track writer requires a large amount of time for the preformat recording. Furthermore, since the single-purpose servo track writer is quite expensive, the cost needed for the preformat recording becomes higher.

This problem becomes more critical as the track density of a magnetic recording reproduction device is improved. In addition to the increased number of tracks in the radial direction of the disc, a longer time is required for the preformat recording due to the following reason. That is, as the track density is improved, the positioning of the magnetic head is required with high precision, so that an angle interval, at which the preformat recording area for recording the information signals such as the servo signal for tracking is provided in one circle of the disc, needs to be reduced. Therefore, as the device has higher recording density, the amount of signals to be recorded in the disc by the preformat recording is increased, and a large amount of time is needed.

Furthermore, there is a tendency for a magnetic disc medium to become smaller in diameter, but the demand for large-diameter discs of 3.5 inches and 5 inches also is still great. As the recording area of the disc is larger, the amount of signals to be recorded by the preformat recording is increased. Also the cost performance of such a large-diameter disc is affected significantly by the time needed for the preformat recording.

Secondly, due to a spacing between the magnetic head and the magnetic recording medium, and due to a broadening of a recording magnetic field caused by the pole shape of the tip of the magnetic head, the magnetic transition lacks in sharpness in the track edge portion of the recorded preformat signals.

Since the recording by a magnetic head basically is a linear recording achieved by the relative movement of a magnetic head and a magnetic recording medium, a certain amount of spacing must be provided between the magnetic head and the magnetic recording medium in view of the performance of the interface between the magnetic head and the magnetic recording medium. Moreover, due to the construction of the present magnetic head provided with two elements for performing recording and reproduction separately, a pole width on the trailing edge side of a recording gap corresponds to a recording track width, and a pole width on the leading edge side is at least twice as large as the recording track width.

The two problems mentioned above are both factors causing the recording magnetic field to broaden in the recording track edge portion. As a result, there are problems such as lack of sharpness of the magnetic transition in the edge portion of the recording track where the preformat recording was performed or clear areas created on both sides of the track edges. In the present servo tracking technology, the position of a magnetic head is detected based on the amount of change in the reproduction output at the time when the magnetic head went off-track and scanned. Therefore, the magnetic head is not only required to have an excellent S/N ratio when scanning accurately on the tracks just as when data signals recorded between servo areas are reproduced, but also to have a steep change in the reproduction output amplitude at the time when the magnetic head goes off-track and scans, that is, sharp off-track characteristics. Accordingly, when the magnetic transition in the track edge portion where the preformat recording was performed lacks in sharpness, it is difficult to provide the accurate servo tracking technology for recording of submicron tracks in the years to come.

In order to solve the two problems in the preformat recording by the magnetic head as mentioned above, JP10 (1998)-40544A discloses the technology of using a master information carrier including a base on which a pattern of ferromagnetic thin films corresponding to preformat information signals is formed, and after bringing the surface of the master information carrier into contact with the surface of a magnetic recording medium, magnetizing the pattern of the ferromagnetic thin films formed on the master information carrier so as to record a magnetized pattern corresponding to the pattern of the ferromagnetic thin films in the magnetic recording medium. According to this preformat recording technology, an excellent preformat recording can be performed efficiently without sacrificing other important performance such an S/N ratio of the recording medium, interface performance and so forth.

According to the content disclosed by the same publication, the pattern of the ferromagnetic thin films corresponding to the preformat information signals such as the servo signal for tracking, the address information signal and the reproduction clock signal can be formed on the surface of the master information carrier by using the conventional photolithography technique.

FIG. 8 shows an example of this pattern array of ferromagnetic thin films. 22 is an array of ferromagnetic thin films.

FIG. 9 is a partial cross-sectional view of a master disc for a magnetic transcription used for transcribing servo signals in a magnetic disc by the method shown in the same publication. 21 is a master disc base, and 22 is a ferromagnetic thin film. The ferromagnetic thin films 22 are buried partially in the master disc base 21. As for the ferromagnetic thin film 22, soft magnetic materials having a high saturation magnetic flux density such as cobalt and permalloy are used.

FIG. 10 is a partial perspective view showing the configuration of a conventional master disc provided with the array of the ferromagnetic thin films 22 as mentioned above. 25 is a land portion provided on the master disc, which is configured to be joined with the surface of a magnetic disc when the magnetic disc is contacted closely therewith. Moreover, an array pattern portion 24 of the ferromagnetic thin films is distributed on the surface of the land portion 25. 26 is a concave portion having a predetermined difference in level with the land portion 25.

FIG. 11 is a plan view of the same conventional master disc. The broken line shows an outer diameter of a magnetic disc 27, in which information is transcribed by joining the master disc 23 with the magnetic disc 27 in the opposed state. The concave portion 26 is expanding radially from the central portion of the master disc 23 in the form of plural grooves and is closed at a point inward of the outer diameter of the magnetic disc 27. On the other hand, the land portion 25 is expanding radially from the central portion toward the periphery of the master disc 23 and is linked together at a point inward of the outer diameter of the magnetic disc 27.

In this way, when the magnetic disc 27 is contacted closely with the master disc 23 at the time of transcription, the concave portion 26 forms a radial space that is closed at the peripheral end portion of the magnetic disc 27 and open at the internal circumferential end portion of the magnetic disc 27.

FIG. 12 to FIG. 15 are drawings for explaining the process of a magnetic transcription performed in the magnetic disc 27 using the above-mentioned master disc 23. In these drawings, 28 is a spindle for supporting the magnetic disc 27, and 29 is a magnet generating a transcription magnetic field.

The first stage of the magnetic transcription is, as shown in FIG. 12, to closely contact the magnet 29 with the magnetic disc 27 and to perform a rotational scanning in the circumferential direction of the magnetic disc 27. Through this operation, as shown by the arrows in FIG. 14, first magnetization 30 magnetized in one circumferential direction remains on the entire surface of the magnetic disc 27.

The second stage of the magnetic transcription is, as shown in FIG. 13, to overlap the master disc 23 on the magnetic disc 27 that has been magnetized in one direction. Next, air is exhausted from a vent hole of the spindle 28 so as to emit the air present between the master disc 23 and the magnetic disc 27. Here, the air contained in the space formed by the concave portion 26 of the master disc 23 and the magnetic disc 27 is emitted, and a negative pressure is developed in the concave portion 26, so that the master disc 23 and the magnetic disc 27 are joined together.

Next, as in the first stage, the magnet 29 is contacted closely with the master disc 23, and a rotational scanning is performed in the circumferential direction of the magnetic disc 27. At this time, the rotational scanning direction may be either the same direction as in the first stage or the opposite direction to the first stage, but the polarity of the magnet 29 should be opposite to the polarity thereof in the first stage. Accordingly, as shown in FIG. 15, in the portion facing the array pattern portion 24 of the ferromagnetic thin films in the master disc 23, a pattern magnetization area 31 magnetized according to the array is formed, and furthermore, as shown by the arrows, second magnetization 32 magnetized in one circumferential direction remains in the portion other than the portion facing the array pattern portion 24 of the ferromagnetic thin films in the master disc 23.

The quality of signals recorded in the magnetic disc 27 by such a magnetic transcription is determined by the distance between the ferromagnetic thin film 22 and the surface of the magnetic disc 27 at the time when a transcription magnetic field is applied. That is, the quality is determined by how well the master disc 23 and the magnetic disc 27 are joined together.

With reference to FIG. 16, the problems of conducting a magnetic transcription in the magnetic disc 27 by using the conventional master disc 23 described above will be explained. In FIG. 16, 39 is a vacuum pump for emitting the air present between the magnetic disc 27 and the master disc 23. In the conventional master disc 23, as shown in FIG. 11, the concave portion 26 extending radially from the central portion of the master disc 23 is closed in front of the peripheral end portion of the magnetic disc 27.

Here, in the area where the concave portion 26 is present, the negative pressure due to the vacuum pump 39 is applied to the space formed by the concave portion 26, and due to the difference with the atmospheric pressure, the power of joining the magnetic disc 27 and the master disc 23 together is generated, but there is no such space in a peripheral portion 40 because the concave portion 26 is not present. In other words, in the peripheral portion 40, the power of joining the magnetic disc 27 and the master disc-23 together is not generated In such a portion where the adhesive pressure is not effected, the distance between the ferromagnetic thin film 22 of the master disc 23 and the magnetic disc 27 is not reduced sufficiently. Thus, there was a problem that the probability of causing transcription signal failure is high when a transcription is conducted.

Furthermore, a magnetic head and a magnetic disc in a hard disc drive have a gap of several nanometers, so that the presence of a minute foreign material on the magnetic disc poses a problem. Therefore, the process of manufacturing a magnetic disc includes the step of inspecting for foreign materials on a magnetic disc. This inspection generally is conducted by the method shown in FIG. 17. In FIG. 17, 53 is a laser beam emitted on the surface of the magnetic disc 27; 54 is a regular reflection component of the laser beam 53 reflected on the magnetic disc 27; and 55 is a reflected scattered light scattered by a foreign material on the magnetic disc 27. Conventionally, the reflected scattered light 55 scattered by a foreign material is detected by a detector 56 for judging whether a foreign material is present on the magnetic disc 27 or not.

However, in an internal circumferential edge 58a and a peripheral edge 58b of the magnetic disc 27 shown in FIG. 18, the laser beam 53 is likely to reflect irregularly, and even if there is no foreign material, the reflected scattered light 55 enters the detector 56 and leads the detector 56 to misjudge that a foreign material is present. Therefore, conventionally, as shown in FIG. 18, a foreign material detection range 57 in fact is determined as an area outside a predetermined distance from the internal circumferential edge 58a (generally between 0.1 mm and 0.5 mm) and inside a predetermined distance from the peripheral edge 58b (generally between 0.1 mm and 0.5 mm).

On the other hand, in the manufacturing process of a magnetic disc, the internal circumferential edge 58a or the peripheral edge 58b are held for transportation, so that the probability that a foreign material will be attached is high. Nevertheless, since the internal circumferential edge 58a and the peripheral edge 58b are not included in the foreign material detection range as described above, even when a foreign material 59 is attached on the internal circumferential edge 58a or the peripheral edge 58b of the magnetic disc 27, the probability that this substrate will pass the inspection to be used for manufacturing a magnetic disc is extremely high. FIG. 19 shows the problem of conducting a transcription in the magnetic disc 27 on which such a foreign material is attached. As shown in FIG. 19, at the portions where the foreign material 59 is attached on the magnetic disc 27, the surface of the master disc 23 and the surface of the magnetic disc 27 cannot be joined together and are separated. In such portions, the magnetic field on the surface of the magnetic disc 27 is disturbed, and a magnetic transcription of the information according to the array of the ferromagnetic thin films in the master disc 23 is not performed correctly in the magnetic disc 27.

In other words, since the internal circumferential edge 58a and the peripheral edge 58b of the magnetic disc 27 are not included in the foreign material detection range 57, even when the foreign material is present in these edge areas, the magnetic disc 27 passed the foreign material inspection, so that transcription failure occurred frequently in the internal circumferential edge 58a and the peripheral edge 58b.

Furthermore, also in the manufacturing process of the master disc 23, the peripheral end portion of the master disc is held often for transporting the master disc, so that the probability that a foreign material will be attached on the peripheral end portion of the master disc also was high.

In the conventional master disc 23, as shown in FIG. 11, the area larger than the outer diameter of the magnetic disc 27 is the land portion 25. Therefore, the foreign material attached on the end portion of the master disc 23 by handing the master disc 23 is likely to be transferred to the land portion 25, which is the area contacting the magnetic disc 27. In particular, such a thing happens with a mucilaginous foreign material. The foreign material transferred to the contacting area hinders the master disc 23 from joining with the magnetic disc 27, thus causing transcription signal failure to occur.

As described above, conventionally, there also was the problem that the foreign material attached on the master disc or the magnetic disc hindered the adhesion between the master disc and the magnetic disc, thereby causing transcription signal failure to occur.

In order to solve the above-mentioned problems, it is an object of the present invention to provide a master disc having strong adhesion with a magnetic disc and to achieve an excellent magnetic transcription without causing any unevenness over the entire magnetic disc.

DISCLOSURE OF THE INVENTION

In order to achieve the above object, a master disc of the present invention is characterized in that a master disc carrying specific information according to an array of ferromagnetic films on a base surface is used for recording a magnetized pattern corresponding to the array of the ferromagnetic films in a magnetic disc through application of a magnetic field with the master disc closely contacting the master disc, and is provided on one principal plane with a radial land portion where the array of the ferromagnetic thin films is formed and a concave portion against the land portion, wherein the land portion and the concave portion are formed such that the land portion is joined with the surface of the magnetic disc while the concave portion is not contacted with the surface of the magnetic disc when the magnetic disc is overlapped on the principal plane, and also that a space surrounded by the surface of the magnetic disc and the concave portion is open to air at a peripheral end portion of the magnetic disc.

In the above-mentioned master disc, it is preferable that the land portion is formed to reach an area outside a peripheral end portion of the magnetic disc when the magnetic disc is overlapped on the principal plane.

Furthermore, it is preferable that the land portion is formed to be inward of a position corresponding to the peripheral end portion of the magnetic disc when the magnetic disc is overlapped on the principal plane.

It is preferable that the land portion is formed to be outward of a position corresponding to the internal circumferential end portion of the magnetic disc when the magnetic disc is overlapped on the principal plane.

Furthermore, it is preferable that the diameter of the master disc is larger than that of the magnetic disc.

In the above-mentioned master disc, it is preferable that the difference in level between the land portion and the concave portion is in the range between 3 micrometers and 100 micrometers, and it is more preferable that the difference in level is in the range between 3 micrometers and 50 micrometers.

In the above-mentioned master disc, in the case where a magnetic disc to be manufactured is a 3.5 inch hard disc, it is preferable that an inner diameter of an area on the principal plane where the land portion is formed radially is in the range between 25.1 mm and 28.0 mm, and an outer diameter of the area is in the range between 95.1 mm and 97.0 mm. Furthermore, in this case, it is more preferable that an outer diameter of the master disc is in the range between 99.5 mm and 100.0 mm.

Furthermore, to achieve the above object, a method for manufacturing a magnetic disc according to the present invention is characterized by the steps of overlapping a master disc according to any one of the above configurations on a magnetic disc, applying a magnetic field while generating airflow in a space formed by the magnetic disc and the concave portion of the master disc by exhausting from a central side of the magnetic disc and performing a preformat recording of a magnetized pattern corresponding to the array of the ferromagnetic film of the master disc in the magnetic disc.

BEST MODE FOR CARRYING OUT THE INVENTION

First Embodiment

Figure 1:
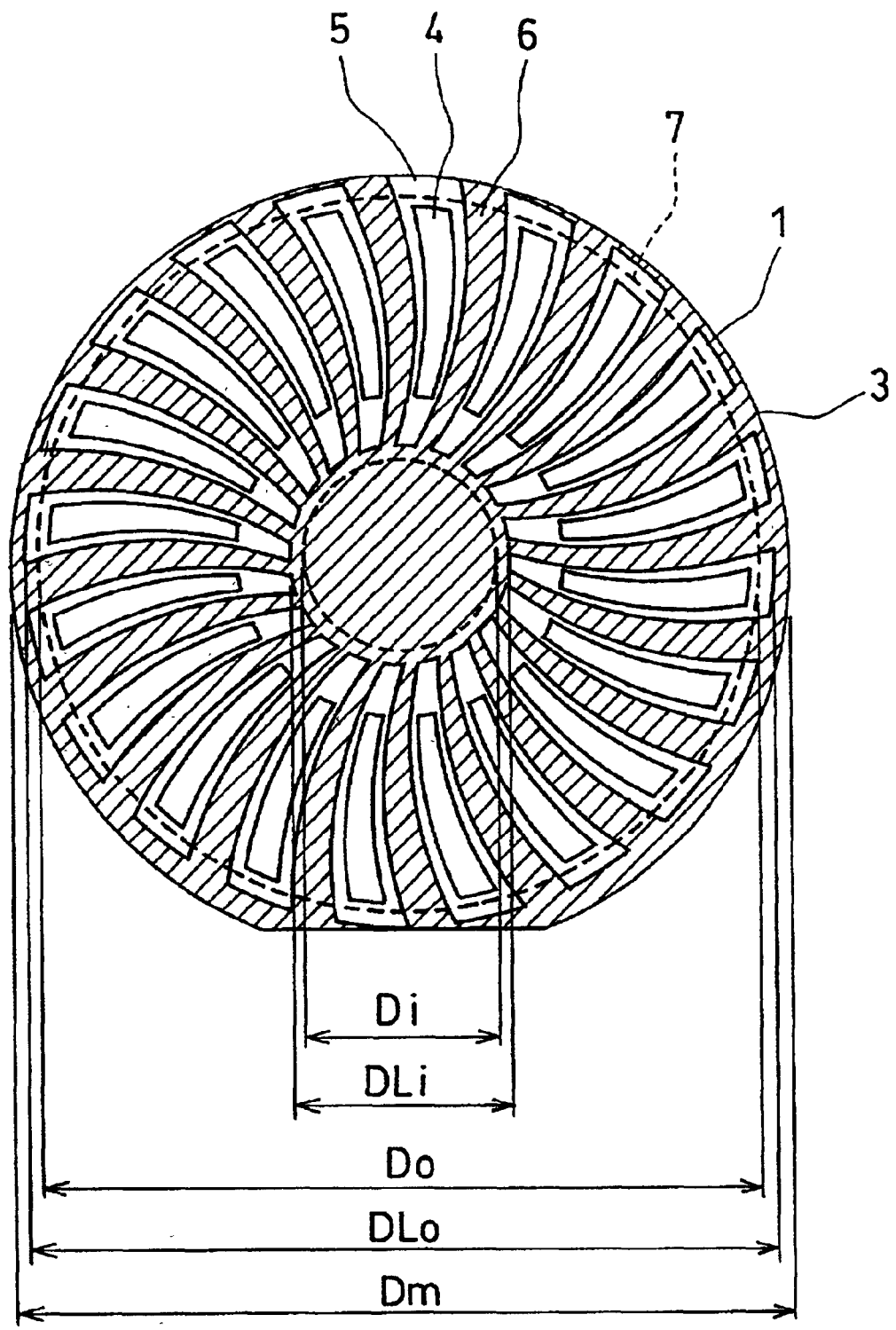
FIG. 1 is a plan view of a master disc according to a first embodiment of the present invention.

A master disc according to an embodiment of the present invention is used for transcribing magnetic information in a magnetic disc and is provided on its surface with a land portion where an array of ferromagnetic thin films is formed and a concave portion having a difference in level with the land portion. The land portion and the concave portion are formed such that the land portion is joined with the surface of the magnetic disc when the magnetic disc is overlapped on the surface of this master disc while fitting at the center, and that the concave portion is not contacted with the surface of the magnetic disc, and also that a space surrounded by the surface of the magnetic disc and the concave portion is open to air at a peripheral end portion of the magnetic disc.

According to this configuration, when air is sucked from a central hole of the magnetic disc in a state in which the master disc and the magnetic disc are joined together, gas flows inside the concave portion from the portion opened to air in the peripheral end portion of the magnetic disc toward the center of the magnetic disc. Due to this, a negative pressure is developed inside the concave portion, and the master disc and the magnetic disc are pressed together through atmospheric pressure. Therefore, the adhesion of the master disc with the magnetic disc is improved, and thus an excellent magnetic transcription without having any unevenness can be performed over the entire surface of the magnetic disc.

Furthermore, the master disc of the present embodiment is formed such that the land portion extending radially from the center of the master disc reaches an area outside the peripheral end portion of the magnetic disc when the magnetic disc is overlapped on this master disc while fitting at the center. According to this configuration, the concave portion is present outside the peripheral end portion of the magnetic disc, so that a negative pressure is developed to the utmost periphery of the magnetic disc, and therefore, the adhesive pressure of the master disc with the magnetic disc is applied effectively also at the peripheral end portion of the magnetic disc. Thus, an excellent magnetic transcription without any unevenness can be performed over the entire surface of the magnetic disc.

Furthermore, when the difference in level between the land portion and the concave portion is in the range between 3 micrometers and 100 micrometers, the gas flowing in the concave portion has a negative pressure even when the master disc or the magnetic disc is curved, so that the master disc and the magnetic disc can be joined together.

Furthermore, according to the method where, after overlapping the master disc of the present embodiment on the magnetic disc while fitting at the center, air is exhausted from the central hole of the magnetic disc and airflow is generated in the space formed by the magnetic disc and the concave portion of the master disc, and a negative pressure is developed in the concave portion of the master disc, so that the magnetic disc and the master disc can be pressed together.

In the following, a first embodiment of the master disc according to the present invention will be described more specifically.

FIG. 1 is a plan view of a master disc 3 in the present embodiment.

The broken lines in small and large concentric circles in the drawing show the outermost periphery and the innermost circumference of a magnetic disc 7 used for conducting a magnetic transcription by joining it with this master disc 3.

Figure 8:
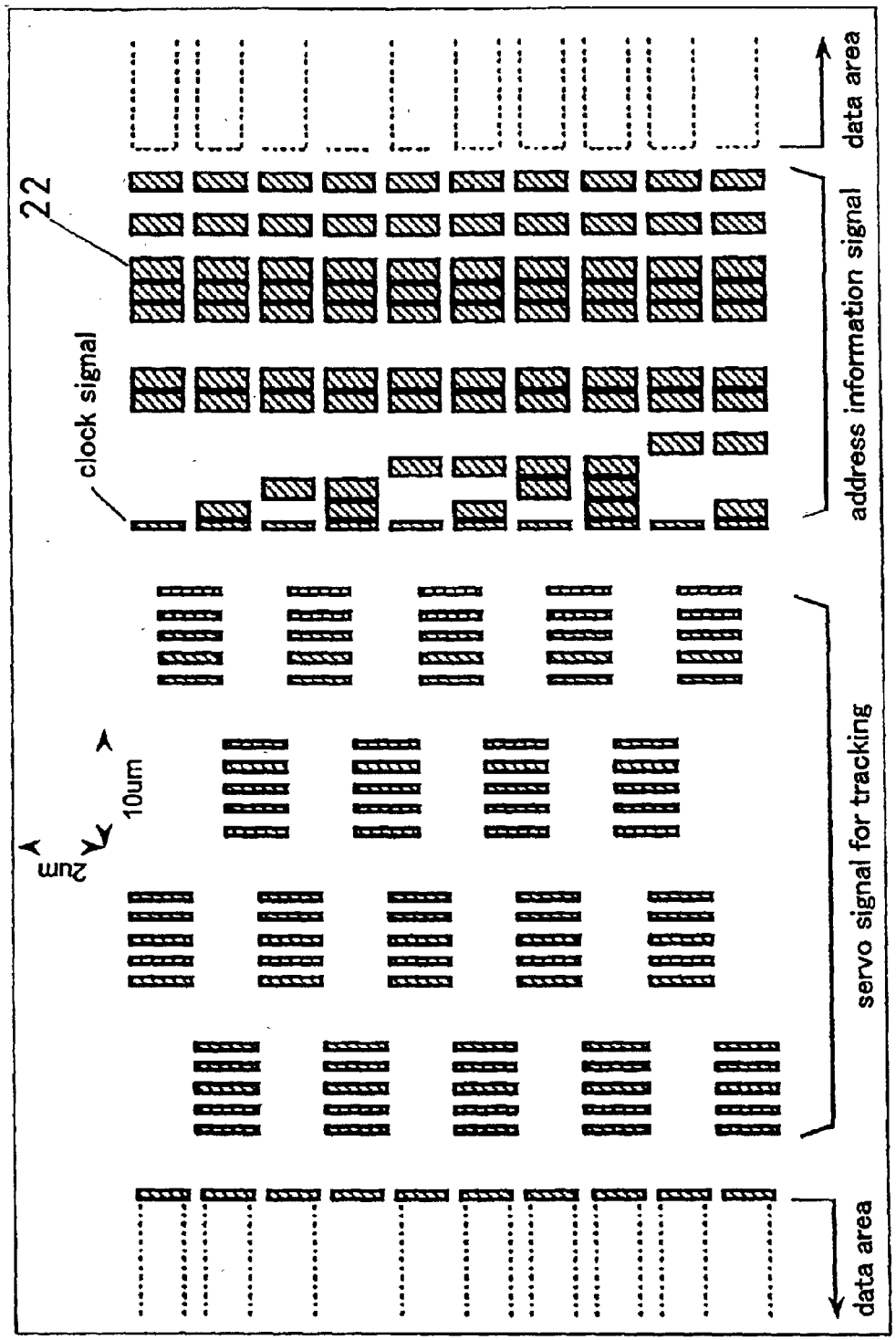
FIG. 8 is an explanatory diagram showing one example of a magnetic servo pattern of a conventional hard disc.

As shown in FIG. 1, a land portion 5, where an array pattern portion 4 of ferromagnetic thin films is formed and the magnetic disc 7 is to be contacted closely, is formed respectively into an isolated radial shape. The land portion 5 is present in a range between a diameter DLi, which is larger than an inner diameter Di of the magnetic disc 7, and a diameter DLo, which is larger than-an outer diameter Do of the magnetic disc 7. In addition, in the array pattern portion 4, as in the example of the conventional master disc shown in FIG. 8, the ferromagnetic thin films are arranged in a pattern according to specific information to be recorded by a preformat recording in the magnetic disc 7. Furthermore, an outer diameter Dm of a master disc base 1 is larger than an outer diameter Do of the magnetic disc 7.

As the master disc base 1, the master disc 3 shown in FIG. 1 uses a silicon wafer of a shape that is not a perfect circle but a perfect circle with a part thereof chopped off. However, the shape of the master disc base is not limited to the shape shown in FIG. 1, and a master disc base of an arbitrary shape including a perfect circle can be used.

Figure 2:
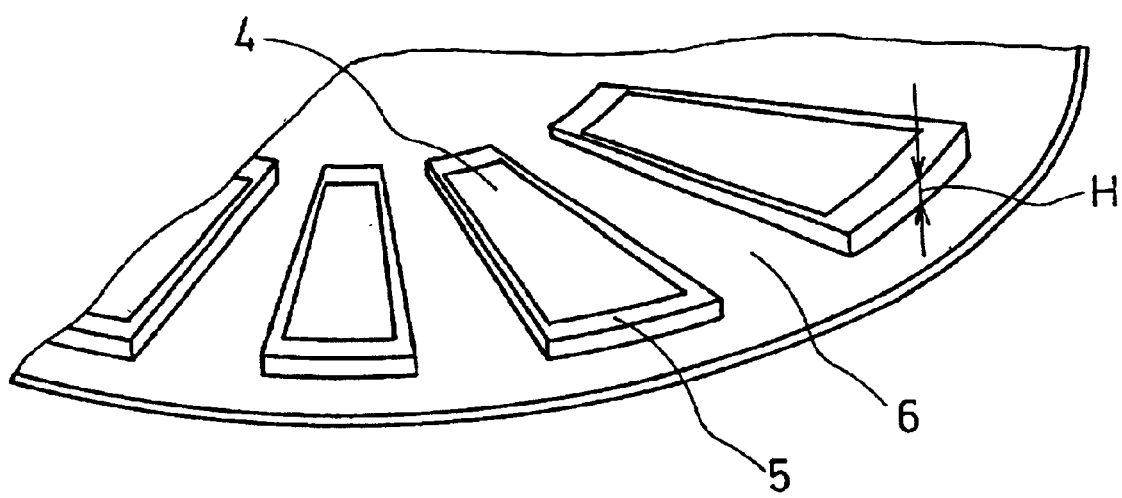
FIG. 2 is a partial perspective view of the above-mentioned master disc.

Furthermore, as shown in FIG. 2, an area other than the land portion 5 is formed as a concave portion 6 with a difference in level H with the land portion 5.

In the case where the magnetic disc 7 is a so-called 3.5 inch hard disc, the inner diameter Di and the outer diameter Do are approximately of the following sizes.

Di=25 mm

Do=95 mm

Therefore, it is appropriate to determine the dimensions of the master disc 3 in this case, for example, as follows:

DLi=25.1 mm–28 mm

DLo=95.1 mm–97 mm

Dm=99.5 mm–100 mm

In other words, it is preferable to determine the outer diameter DLo of the land portion 5 to be larger than the outer diameter Do of the magnetic disc 7.

Figure 3:
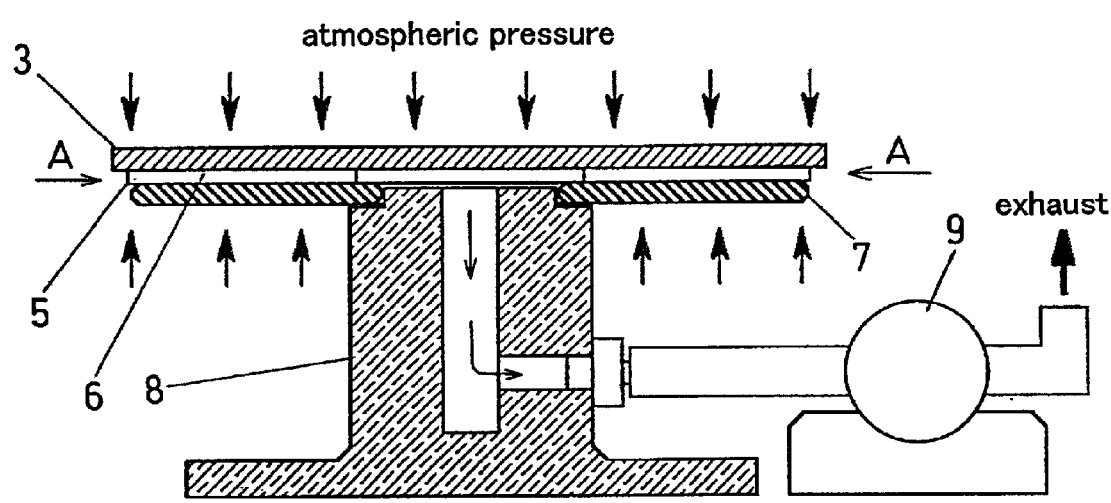
FIG. 3 is an explanatory diagram schematically showing a magnetic transcription method using the above-mentioned master disc.

With reference to FIG. 3, as one of the manufacturing steps of a magnetic disc, the state of conducting a preformat recording in a magnetic disc through a magnetic transcription using the master disc 3 of the present embodiment will be explained. In FIG. 3, 9 is a vacuum pump for exhausting air contained between the magnetic disc 7 and the master disc 3.

Figure 12:
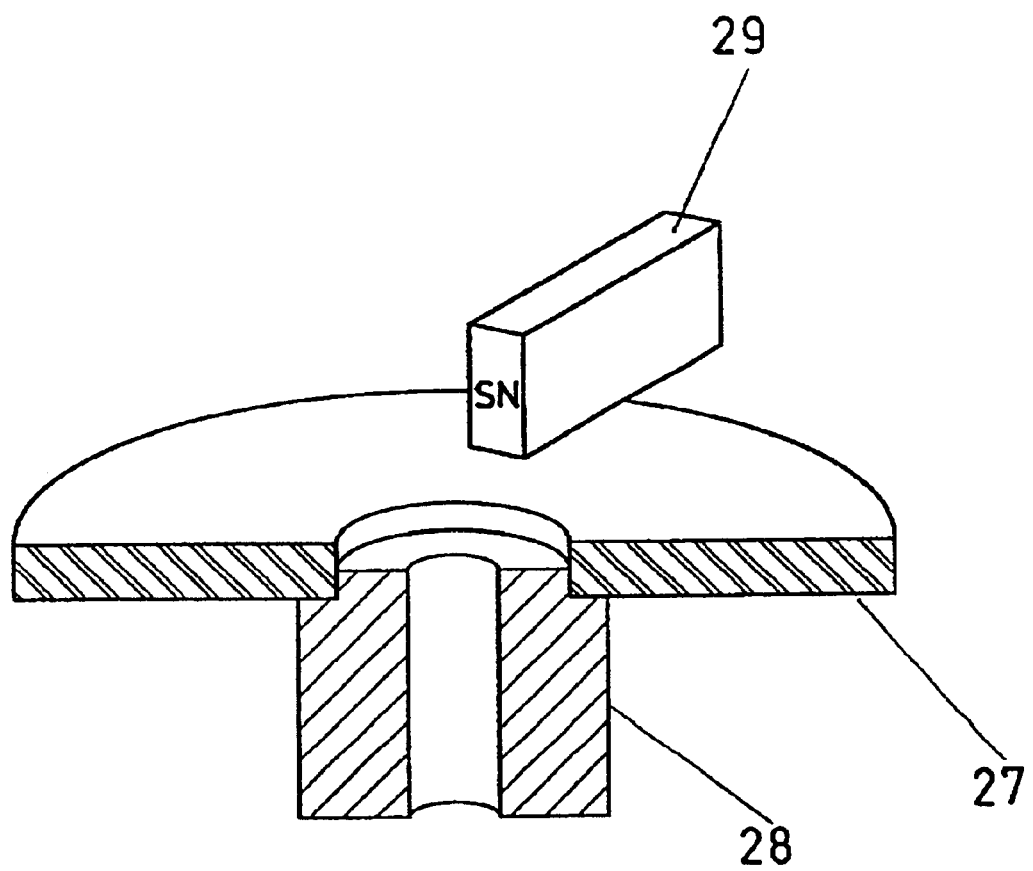
FIG. 12 is an explanatory diagram showing one step of a magnetic transcription using a conventional master disc.
Figure 14:
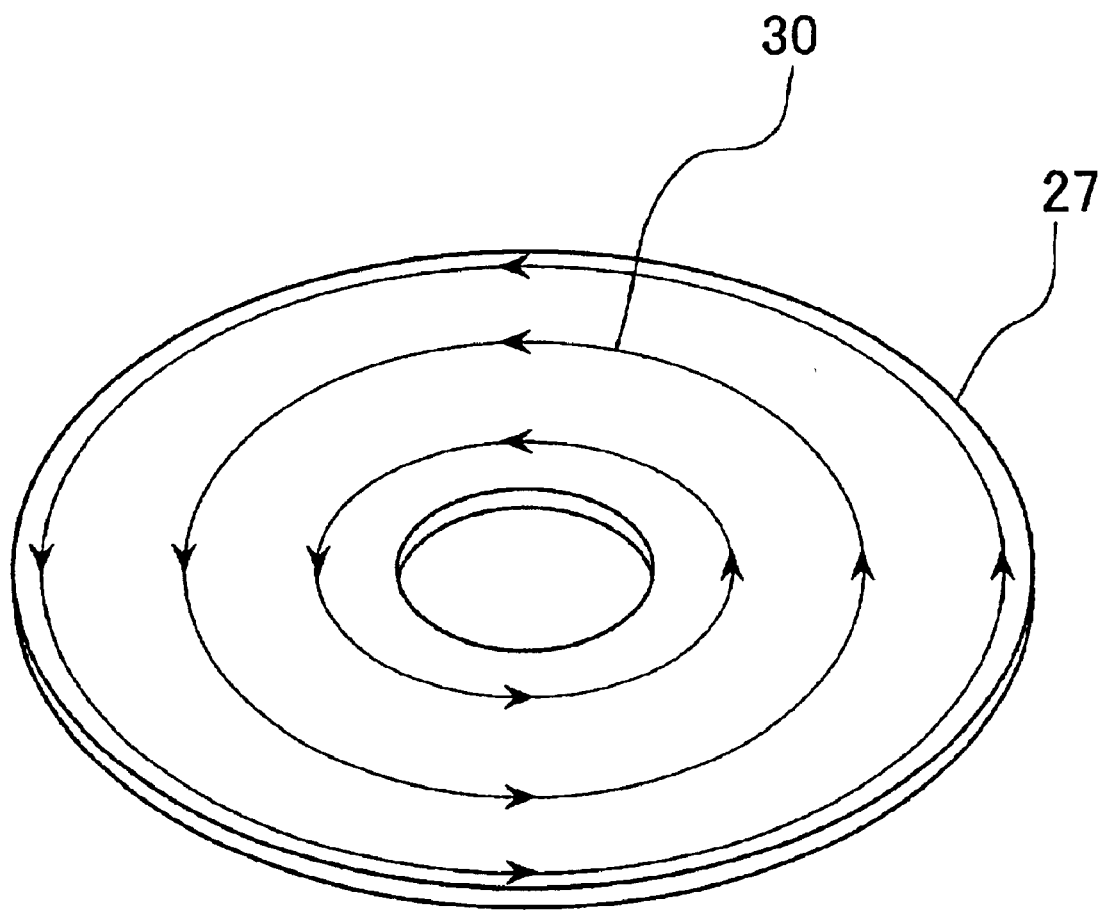
FIG. 14 is a schematic diagram for explaining magnetization of a magnetic disc according to the step shown in FIG. 12.
Figure 15:
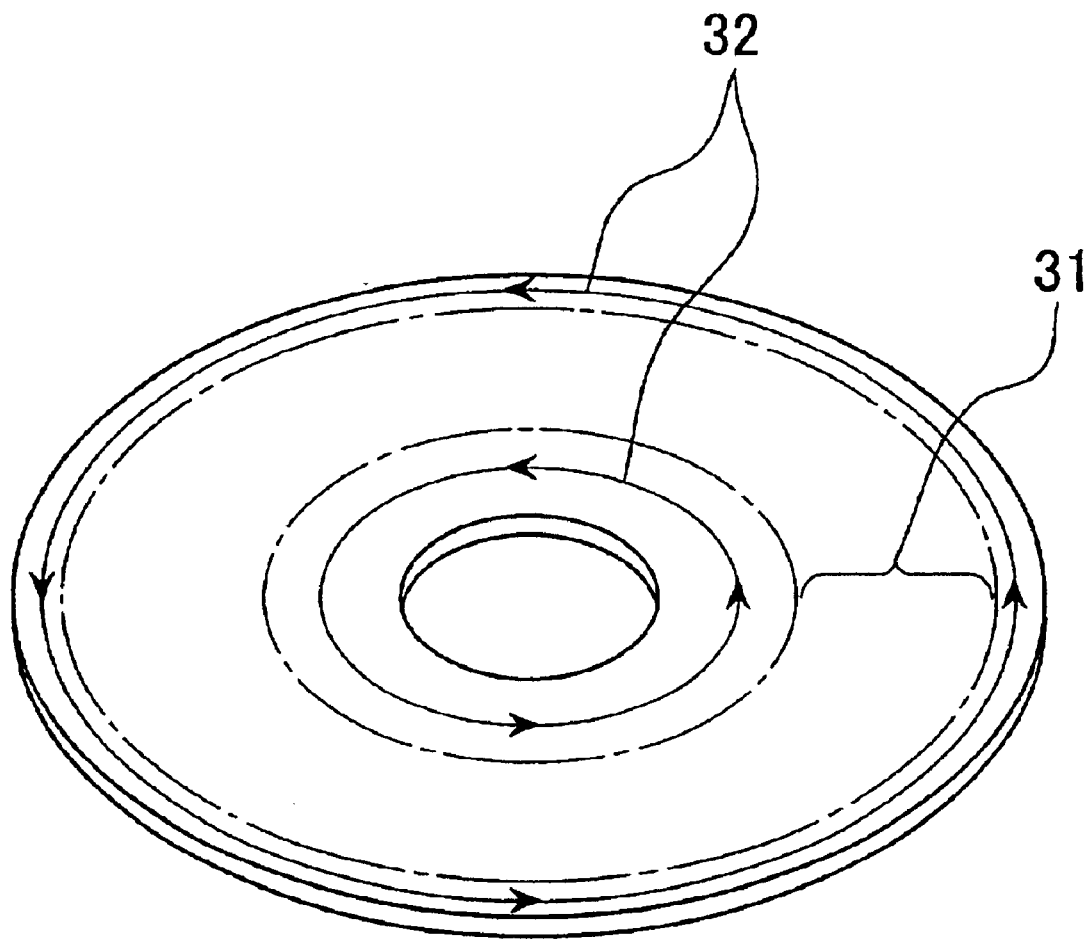
FIG. 15 is a schematic diagram for explaining magnetization of a magnetic disc according to the step shown in FIG. 13.
Figure 16:
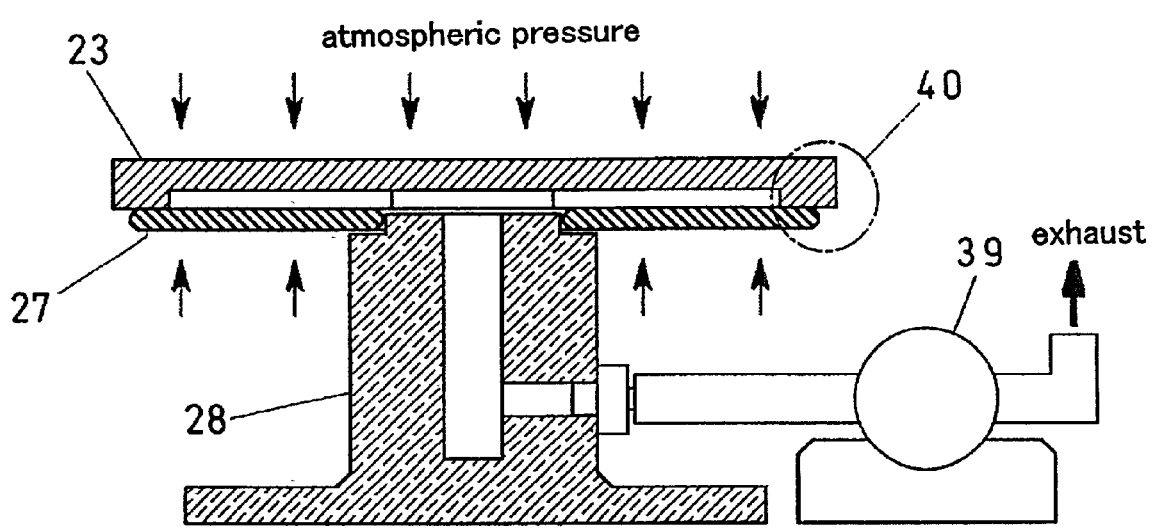
FIG. 16 is an explanatory diagram schematically showing a magnetic transcription using a conventional master disc.
Figure 17:
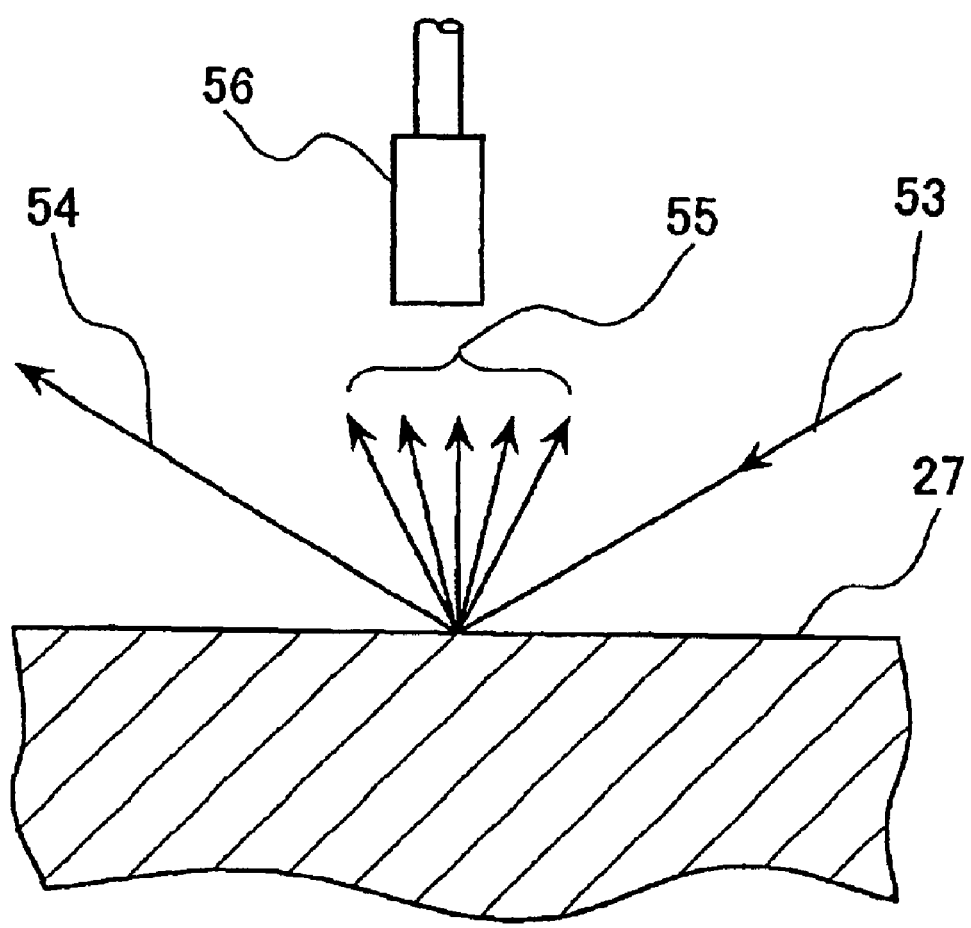
FIG. 17 is an explanatory diagram schematically showing the state of a foreign material inspection in the manufacturing process of a conventional magnetic disc.
Figure 18:
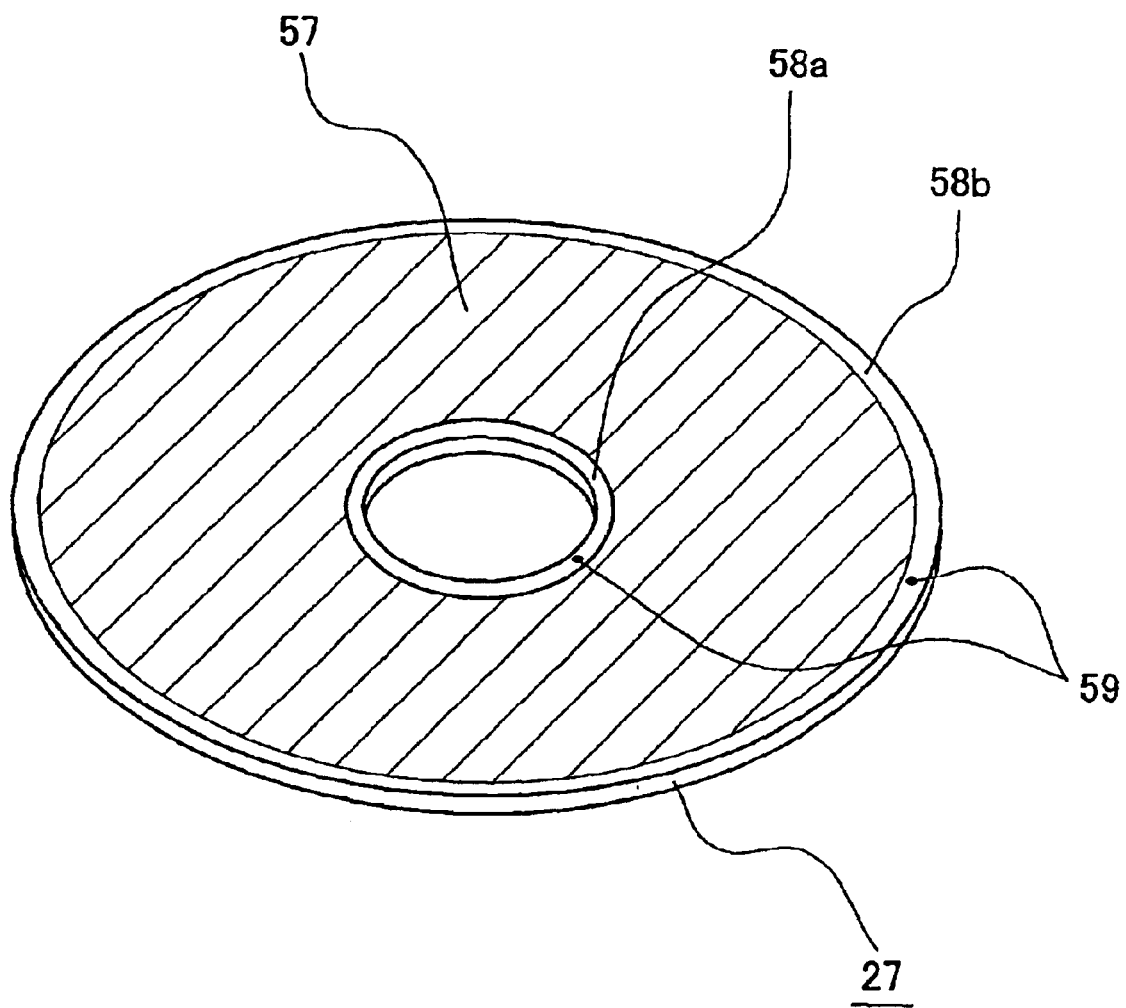
FIG. 18 is an explanatory diagram showing the range of a foreign material inspection in the manufacturing process of the above-mentioned conventional master disc.
Figure 19:
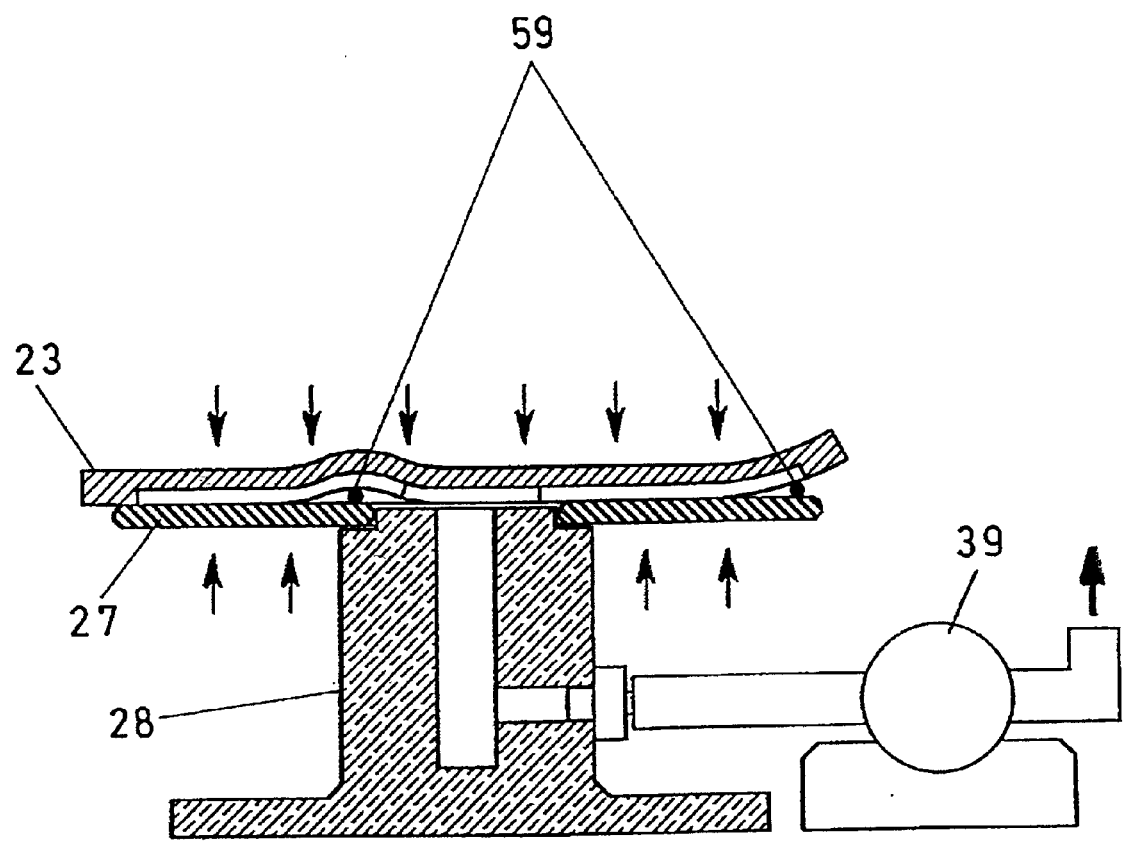
FIG. 19 is an explanatory diagram schematically showing another example of a magnetic transcription using a conventional master disc.

In addition, the step shown in FIG. 3 is the second stage of a magnetic transcription. In the first stage of the magnetic transcription, as the conventional step shown in FIG. 12, a magnet is closely contacted with the magnetic disc 7, and a rotational scanning is performed in the circumferential direction of the magnetic disc 7. Through this operation, as that shown in FIG. 14, a first magnetization in one circumferential direction is formed on the entire surface of the magnetic disc 7.

Figure 13:
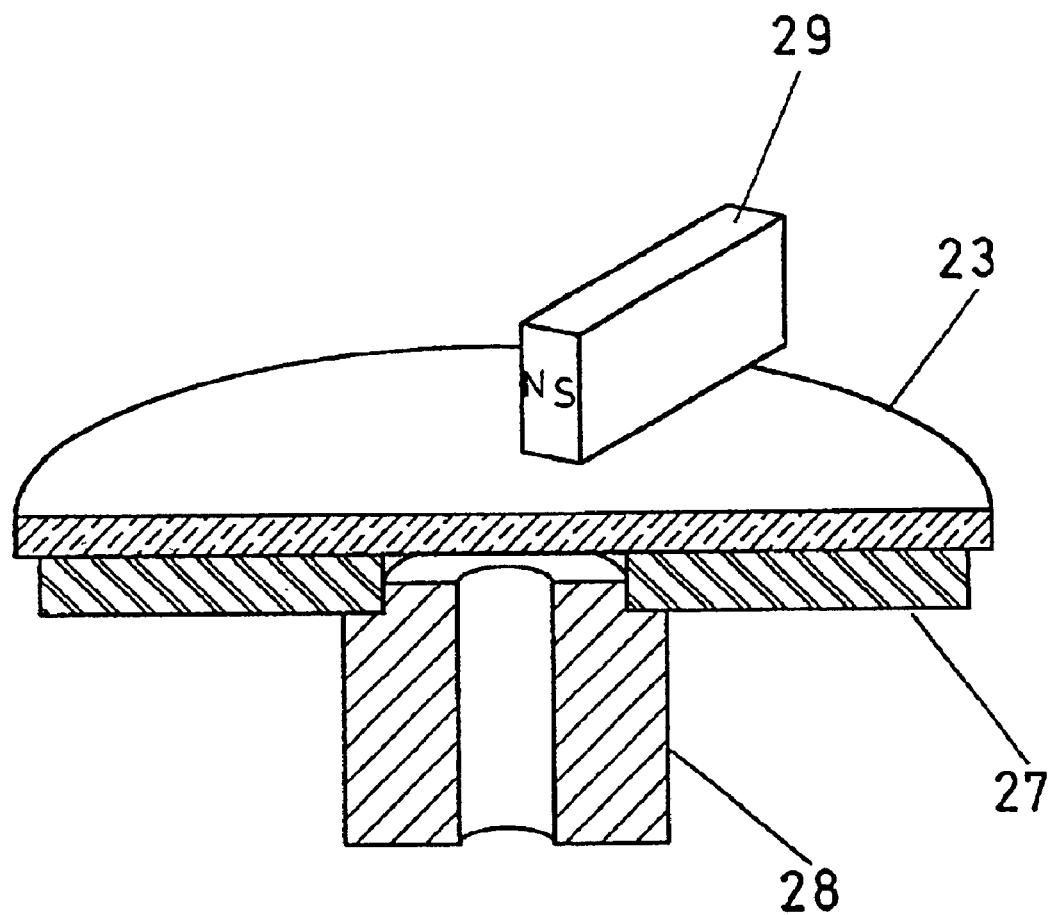
FIG. 13 is an explanatory diagram showing another step of the above-mentioned magnetic transcription.

In the second stage, as shown in FIG. 3, while adjusting the positions of the magnetic disc 7 provided with the first magnetization and the master disc 3, they are overlapped with each other. Then, by operating the vacuum pump 9, as in the conventional step shown in FIG. 13, a magnetic field with the opposite polarity to the first stage is applied by a rotational scanning of the magnet. It is easier to adjust the positions of the magnetic disc 7 and the master disc 3 by marking a point to be matched with the center of the magnetic disc 7 in advance on the master disc 3. This marking can be formed by using a ferromagnetic thin film material, for example, at the same time when the array pattern portion 4 of the ferromagnetic thin films is formed on the master disc substrate 1.

In addition, the rotational scanning direction of the magnet in the second stage of the magnetic transcription may be either the same direction as in the first stage or the opposite direction thereto. At this time, by operating the vacuum pump 9, air is exhausted through a vent hole provided in the center of a spindle 8. Therefore, air flows in a space formed by the concave portion 6 of the master disc 3, which is opened in the peripheral end portion of the magnetic disc 7 (arrow A), and the magnetic disc 7. In other words, airflow is generated in the direction from the peripheral side toward the internal circumferential side of the disc in the radial grooves formed in the concave portion 6.

At this time, according to Bernoulli's theorem, the pressure in the space where the airflow is generated becomes smaller than the atmospheric pressure, and adhesive power is generated between the master disc 3 and the magnetic disc 7.

This space portion is extending to the peripheral end portion of the Magnetic disc 7, so that the magnetic disc 7 and the master disc 3 also are pressed together by the atmospheric pressure at the peripheral end portion of the magnetic disc 7. Therefore, adhesion failure at the peripheral end portion of the master disc substrate, which was the case in conducting a transcription by using the conventional master disc, does not occur.

As described above, through the magnetic transcription using the master disc 3 of the present embodiment, a magnetic disc, in which the pattern magnetization area magnetized evenly from the central portion of the disc to the peripheral portion of the disc according to the array is formed in the portion facing the array pattern portion 4 of the ferromagnetic thin films in the master disc 3, and also in which the second magnetization in one circumferential direction is left in the portion other than the portion facing the array pattern portion 4, can be manufactured.

Figure 4:
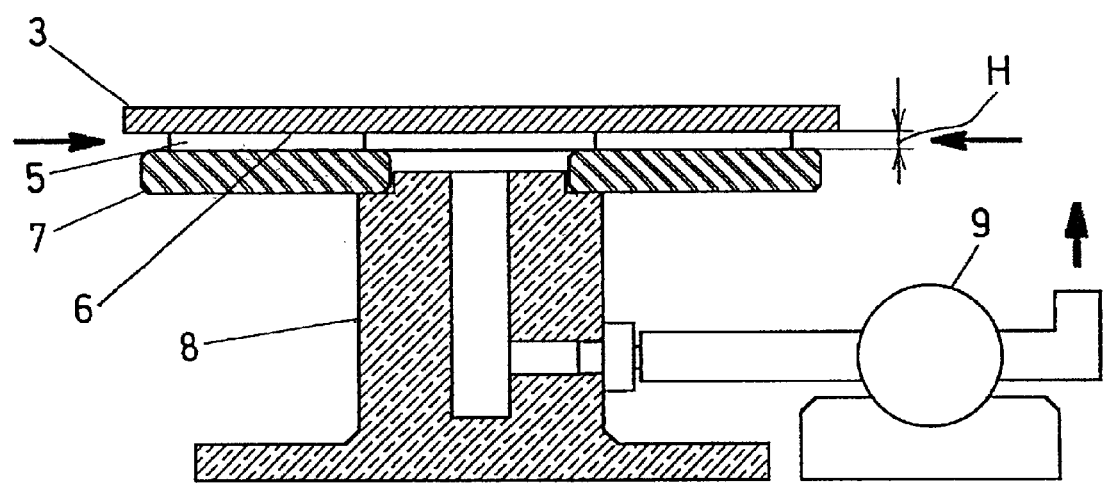
FIG. 4 is a diagram for explaining conditions with respect to a difference in level formed between a land portion and a concave portion of the above-mentioned master disc.

Next, with reference to FIG. 4, the difference in level between the land portion 5 and the concave portion 6 of the master disc 3 in the present embodiment will be explained. In the present embodiment, after the master disc 3 and the magnetic substrate 7 are closely contacted with each other, airflow is generated in the space portion formed by the concave portion of the master disc 3 and the surface of the magnetic disc 7 through the vent hole of the spindle 8 by operating the vacuum pump 9. Due to the effect thereof, a negative pressure is developed in the space portion, and the master disc 3 and the magnetic disc 7 are joined together. Therefore, the dimensions, particularly the height, of this space portion greatly affect the generation of the negative pressure. The height of the space portion, that is, a difference in level H between the land portion 5 and the concave portion 6 of the master disc 3 preferably is determined to be not more than 100 micrometers, and more preferably not more than 50 micrometers. If the difference in level H becomes larger than 100 micrometers, a negative pressure is less likely to be developed.

Next, the lower limit of the difference in level H will be explained below.

Figure 5:
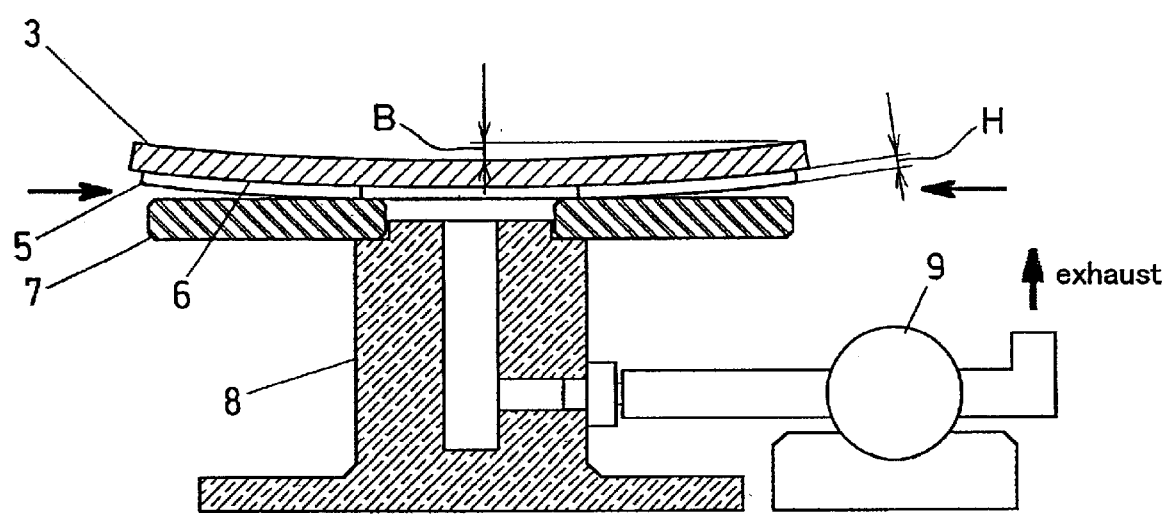
FIG. 5 is a diagram for explaining conditions with respect to a difference in level formed between a land portion and a concave portion in the case where the above-mentioned master disc is curved.

FIG. 5 shows a case in which the master disc 3 is curved. As for the partial cross-sectional structure, the master disc 3 according to the present embodiment has the same structure as the conventional master disc shown in FIG. 9. As the master disc base 1, a silicon wafer that can be processed easily with precision on the order of micron by a method such as dry etching is used. Silicon wafers available on the market generally are curved by a curve B of about 3 to 20 micrometers. If the difference in level H between the land portion. 5 and the concave portion 6 shown in FIG. 5 is too small, the flow rate of the gas flowing in the concave portion of the master disc 3 when exhausted from the central portion of the magnetic disc 7 by operating the vacuum pump 9 is small, so that a negative pressure is not sufficiently developed in the concave portion. As a result, it is not possible to straighten the curve of the master disc 3 so as to join it with the magnetic disc 7. In this state, the ferromagnetic thin films formed in the land portion 5 cannot approach to the magnetic disc 7 sufficiently, so that the transcription signal is confused. Accordingly, it is clear that the difference in level H between the land portion 5 and the concave portion 6 of the master disc 3 is required to have a certain minimum value. As a result of experiments, it became clear that the difference in level is required to be not less than 3 micrometers.

Second Embodiment

In the following, a second embodiment of the present invention will be described.

A master disc of the present embodiment is provided on one principal plane with a radial land portion, which has an array of ferromagnetic thin films formed and is joined with a surface of a magnetic disc when overlapped on the surface, and a concave portion, which is not joined with the surface. The land portion is formed such that, when the magnetic disc is overlapped on the master disc, an end portion on an outermost peripheral side of the land portion is located inward of a peripheral end portion of the magnetic disc by a predetermined distance. According to this configuration, it is possible to avoid hindering the master disc from joining with the magnetic disc by a foreign material in the peripheral end portion of the magnetic disc.

Furthermore, in the master disc of the present embodiment, the land portion is formed such that, when the magnetic disc is overlapped on the master disc, an end portion on an innermost circumferential side of the land portion is located outward of an inner circumferential end portion of the magnetic disc by a predetermined distance. According to this configuration, it is possible to avoid hindering the master disc from joining with the magnetic disc by a foreign material in the internal circumferential end portion of the magnetic disc.

Furthermore, in the master disc of the present embodiment, the diameter of the master disc is larger than the magnetic disc. According to this configuration, it is possible to avoid hindering the master disc from joining with the magnetic disc by a foreign material in the periphery of the master disc.

Figure 6:
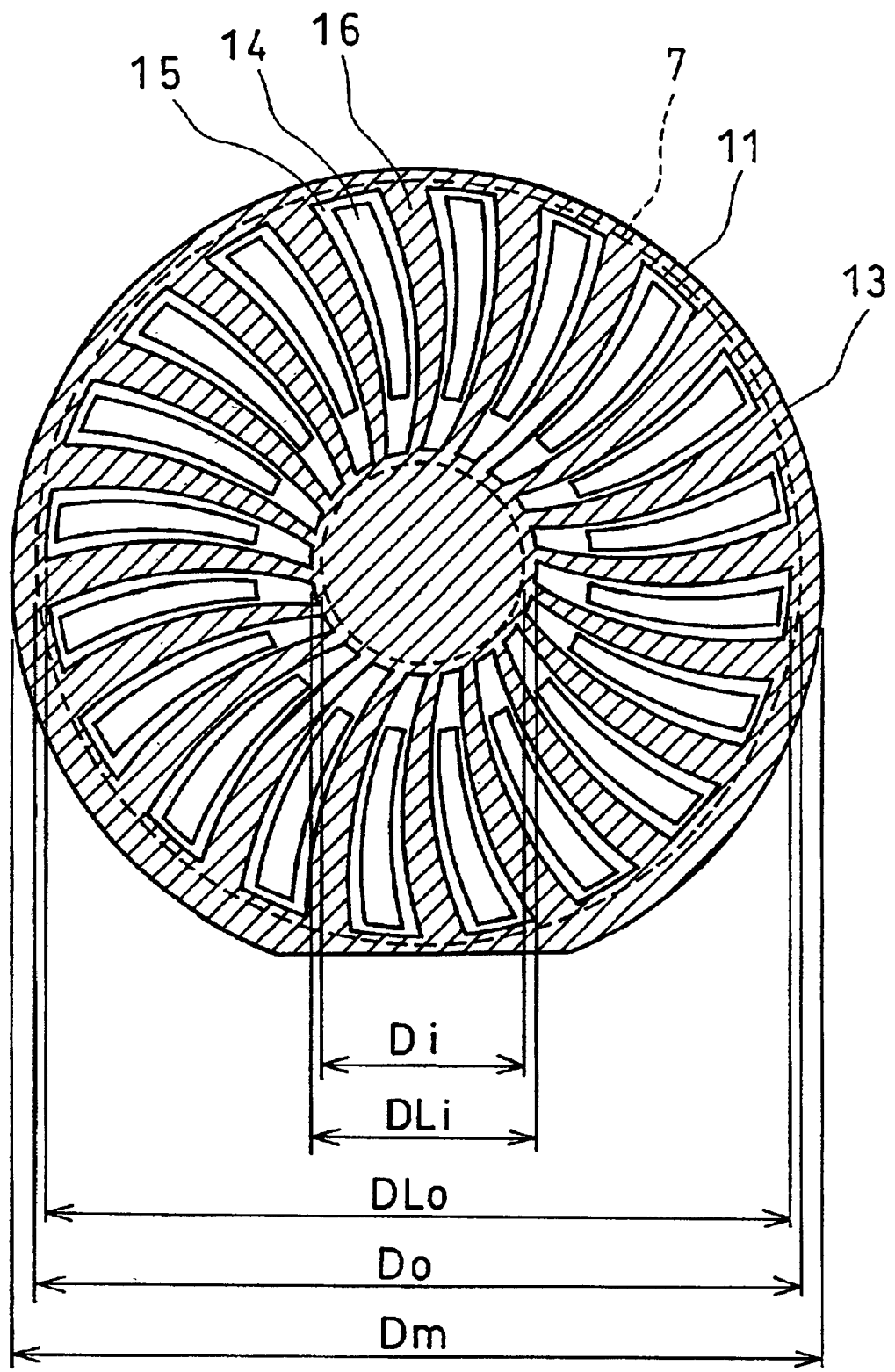
FIG. 6 is a plan view of a master disc according to a second embodiment of the present invention.

FIG. 6 is a plan view of a master disc 13 in the present embodiment. The broken lines in small and large concentric circles in the drawing show the outer diameter and the inner diameter of a magnetic disc 7.

As shown in FIG. 6, a land portion 15 to be joined with the magnetic disc 7 is provided on the surface of the master disc 13, and an array pattern 14 of ferromagnetic thin films is formed on the land portion 15. With regard to the range of the land portion 15, the inner diameter is a diameter DLi, which is larger than an inner diameter Di of the magnetic disc 7, and the outer diameter is a diameter DLo, which is smaller than an outer diameter Do of the magnetic disc 7.

Furthermore, as shown in the drawing, the land portion 15 is formed radially, and an area other then the land portion 15 on the master disc 13 is formed as a concave portion 16 having a difference in level of several micrometers to several tens of micrometers against the land portion 15.

Furthermore, an outer diameter Dm of a master disc base 11 is larger than an outer diameter Do of the magnetic disc 7.

Figure 7:
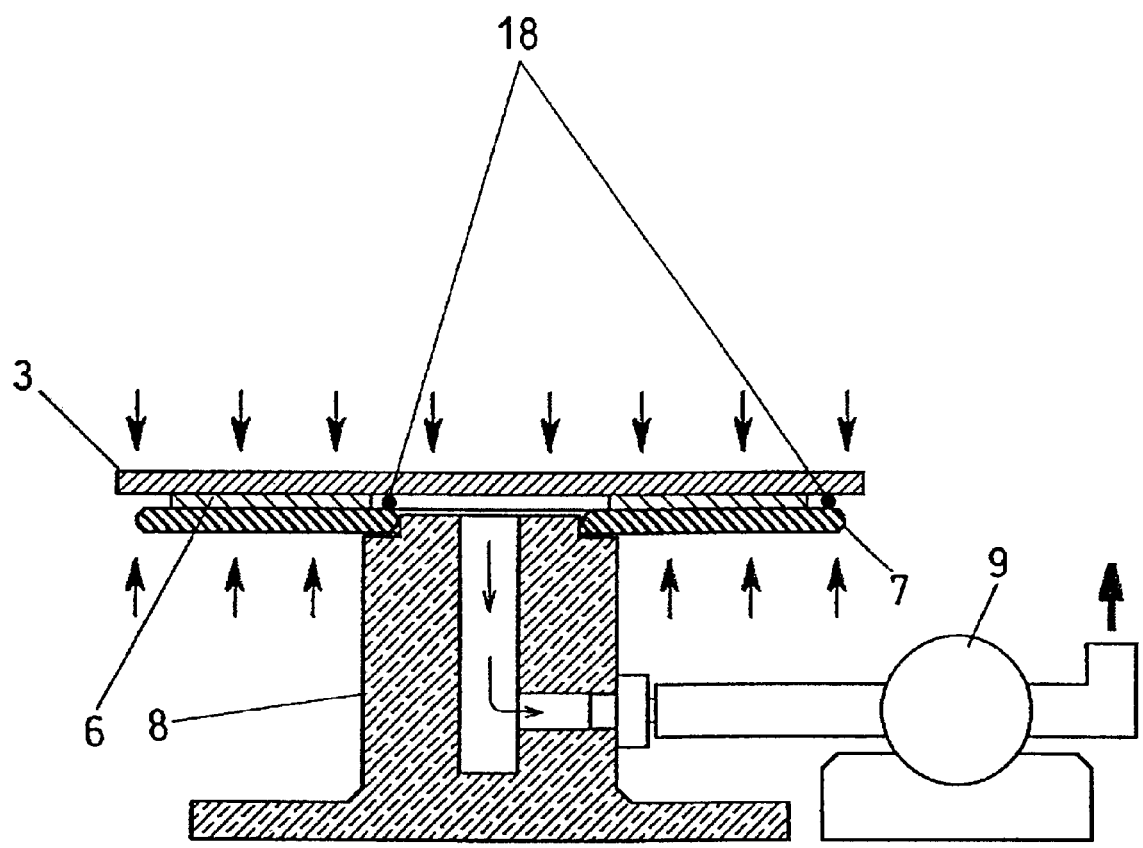
FIG. 7 is an explanatory diagram schematically showing a magnetic transcription method using the above-mentioned master disc.

FIG. 7 is an explanatory diagram showing the state of conducting a magnetic transcription in the magnetic disc 7 by using the master disc 13 of the present embodiment. In FIG. 7, air inside a space formed by the concave portion 16 of the master disc 13 and the surface of the magnetic disc 7 is exhausted through a vent hole of a spindle 8 by a vacuum pump 9. Then, a negative pressure is developed in the space, so that the master disc 13 and the magnetic disc 7 are pressed together by the atmospheric pressure. Thus, the land portion 15 of the master disc 13 is joined with the magnetic disc 7.

Figure 9:
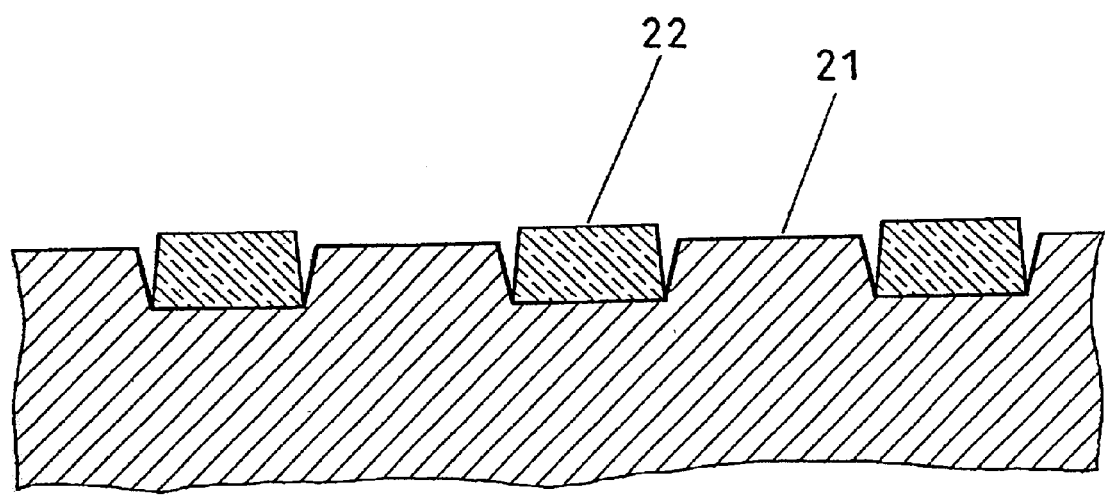
FIG. 9 is a partial cross-sectional view showing the configuration of a conventional master disc.
Figure 10:
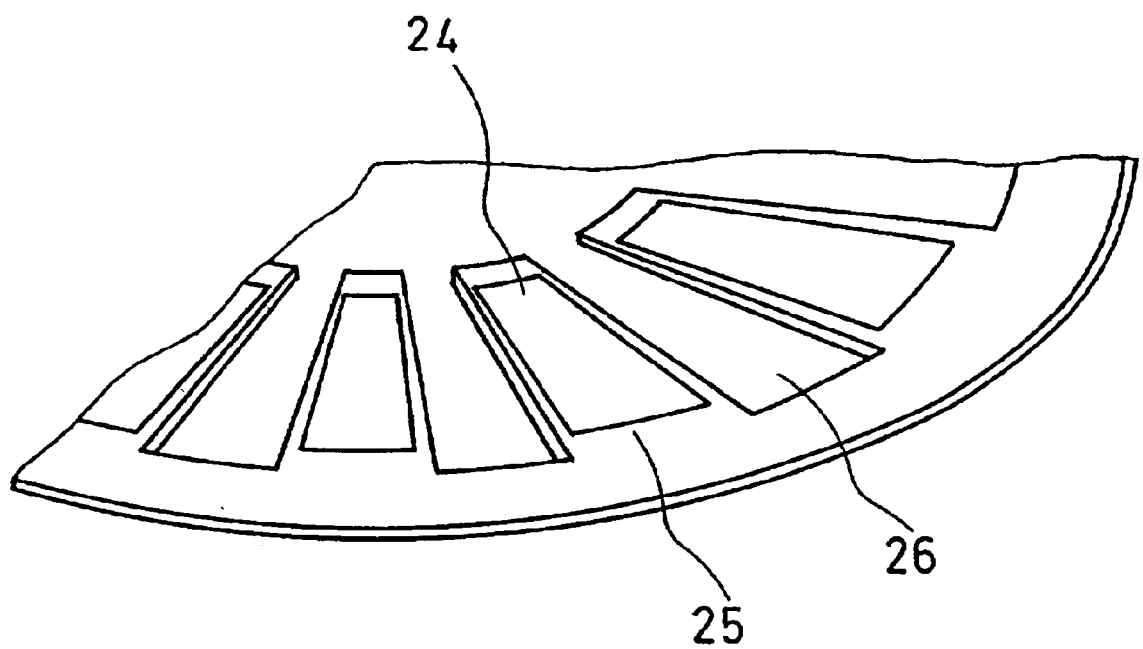
FIG. 10 is a partial perspective view of a conventional master disc.
Figure 11:
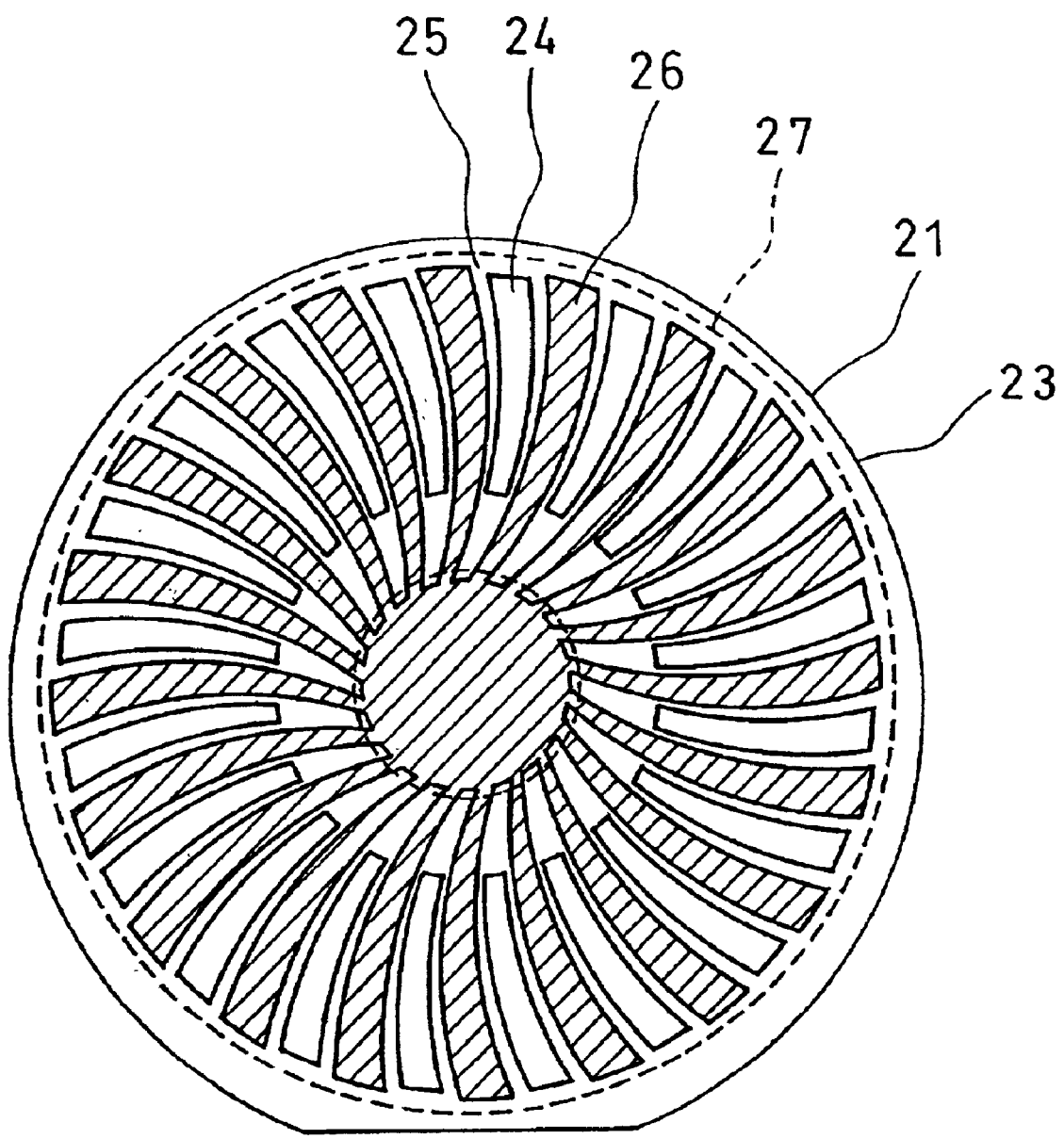
FIG. 11 is a plan view of a conventional master disc.

In addition, the array pattern 14 of the ferromagnetic thin films in the land portion 15 is configured such that, as in the conventional master disc shown in FIG. 9, the ferromagnetic thin films are buried partially in the master disc base. In other words, the master disc 13, which is formed by using the disc-shaped master disc base 11 made of a nonmagnetic material such as a Si substrate, a glass substrate, a plastic substrate etc., is configured such that the concave portion is formed as a plurality of minute array pattern shapes corresponding to information signals on the surface of the land portion 15, and the ferromagnetic thin films are buried in these concave portions.

As for the ferromagnetic thin film, various kinds of magnetic materials including a hard magnetic material, semi-hard magnetic material and a soft magnetic material can be used as long as information signals can be recorded through a transcription in a magnetic disc. For example, Fe, Co, a Fe—Co alloy etc. can be used. In addition, the saturation magnetic flux density of the magnetic material should be as large as possible so that the ferromagnetic thin films can generate a sufficient recording magnetic field regardless of the kind of the magnetic disc. In particular, for a magnetic disc with a high coercivity of more than 2000 oersted or for a flexible disc having a thick magnetic layer, a sufficient recording cannot always be conducted when the saturation magnetic flux density becomes 0.8 or less, so that a magnetic material having a saturation magnetic flux density of not less than 0.8 tesla, preferably not less than 0.1 tesla, is used.

Furthermore, as for the thickness of the ferromagnetic thin films, although it depends on a pit length or saturation magnetization of the magnetic recording medium or a thickness of the magnetic layer, for example, in the case where the pit length is about 1 μ, the saturation magnetization of the magnetic recording medium is about 500 emu/cc, and the thickness of the magnetic layer in the magnetic recording medium is about 20 nm, it is sufficient to have a thickness of about 50 nm to 500 nm.

Here, by using the master disc 13 shown in FIG. 6, even in the case where a foreign material is attached on the internal circumferential end portion or the peripheral end portion of the magnetic disc 7 as shown in FIG. 7, the portion facing this foreign material on the side of the master information disc 13 is the concave portion 16, so that even if the foreign material is present, this foreign material enters the difference in level between the land portion 15 and the concave portion 16. Therefore, the adhesion of the array pattern 14 of the ferromagnetic thin films formed on the land portion 15 with the magnetic disc 7 is not hindered, and thus transcription signal failure does not occur.

Furthermore, with regard to a foreign material attached on the peripheral portion of the master disc 13, when the foreign material is attached on an area outside the outer diameter Do of the magnetic disc 17, this foreign material does not disturb the adhesion of the master disc 13 with the magnetic disc 7 at all. Furthermore, even when a foreign material on the peripheral portion of the master disc 13 is attached on an area inside the outer diameter Do of the magnetic disc 7, not the land portion 15 but only the concave portion 16 is present in the peripheral portion of the master disc 13, so that this foreign material also enters the difference in level between the land portion 15 and the concave portion 16. Therefore, the adhesion of the master disc 13 with the magnetic disc 7 is not disturbed. Thus, transcription signal failure does not occur.

Moreover, even in the case where a foreign material was attached on the peripheral portion in the process of handling the master disc 13, the foreign material likely would be attached on the concave portion 16, and the probability that this foreign material will be shifted to the land portion 15 by clearing the difference in level between the land portion 15 and the concave portion 16 is extremely low. That is, the adhesion of the master disc 13 with the magnetic disc 7 is not disturbed. Therefore, transcription signal failure does not occur.

As for the method for forming the concave portion 16 in the master disc base 11 shown in FIG. 6, it is appropriate to employ a physico-chemical procedure such as the reactive ion etching or the ion milling process in the case where the material of the master disc base 11 is a silicon wafer. However, it is needless to say that the same results can be obtained by employing other methods, for example, by a mechanical procedure such as sand blasting.

As described above, by using the master disc of the present embodiment, it is possible to exclude the effect on transcription signals due to a foreign material present on an internal circumferential end portion or a peripheral end portion, which is unavoidable in the manufacturing process of a magnetic disc, and also to exclude the effect on transcription signals due to a foreign material attached on a peripheral end portion of the master disc by handling the master disc. Thus, a great effect can be achieved by this simple configuration.

Industrial Applicability

As explained above, with the use of the master disc of the present invention, by magnetizing an array of ferromagnetic thin films corresponding to specific information by closely contacting the master disc with a surface of a magnetic disc, the master disc and the magnetic disc are joined together sufficiently at the time when a magnetized pattern corresponding to the array of the ferromagnetic thin films is recorded by a preformat recording on the surface of the magnetic disc. As a result, a magnetic disc causing no transcription signal failure can be manufactured.

What is claimed is:

1. A master disc carrying specific information according to an array of ferromagnetic films on a base surface, the master disc being used for recording a magnetized pattern corresponding to the array of the ferromagnetic films in a slave disc through application of a magnetic field with the master disc closely contacting a slave disc, and provided on one principal surface with a radial land portion where the array of the ferromagnetic film is formed and a concave portion adjacent the land portion, wherein the land portion and the concave portion are formed such that the land portion is joined with a surface of a slave disc positioned on the principal surface while the concave portion is not contacted with the surface of a slave disc positioned on the principal surface, and a space defined by a surface of a slave disc positioned on the principal surface and the concave portion is open to air at a circumference of a slave disc positioned on the principal surface.

2. The master disc according to claim 1, wherein the land portion is formed to reach an area outside a position corresponding to a circumference of a slave disc positioned on the principal surface.

3. The master disc according to claim 1, wherein the land portion is formed to be inward of a position corresponding to a circumference of a slave disc positioned on the principal surface.

4. The master disc according to claim 1, wherein the land portion is formed to be outward of a position corresponding to an internal circumferential end portion of a slave disc positioned on the principal surface.

5. The master disc according to claim 1, wherein a diameter of the master disc is larger than that of a slave disc positioned on the principal surface.

6. The master disc according to claim 1, wherein the difference in level between the land portion and the concave portion is in the range between 3 micrometers and 100 micrometers.

7. The master disc according to claim 1, wherein the difference in level between the land portion and the concave portion is in the range between 3 micrometers and 50 micrometers.

8. The master disc according to claim 1, wherein, in the case where a slave disc to be positioned on the principal surface of the master disc is a 3.5 inch hard disc, an inner diameter of an area on the principal surface where the land portion is formed radially is in the range between 25.1 mm and 28.0 mm and an outer diameter of the area is in the range between 95.1 mm and 97.0 mm.

9. The master disc according to claim 8 having an outer diameter in the range between 99.5 mm and 100.0 mm.

10. A method for manufacturing a slave disc comprising:
positioning a master disc according to claim 1 on a slave disc, applying a magnetic field while generating airflow in a space formed by the slave disc and the concave portion of the master disc by exhausting from a central side of the slave disc and performing a preformat recording of a magnetized pattern corresponding to the array of the ferromagnetic film of the master disc in the slave disc.

11. A master disc in contact with a slave disc, the master disc carrying specific information according to an array of ferromagnetic films on a base surface of the master disc and being used for recording on the slave disc a magnetized pattern corresponding to the array of ferromagnetic films through application of a magnetic field, and provided on one principal surface with a radial land portion where the array of ferromagnetic films is formed and a concave portion is defined adjacent the land portion, wherein the land portion and the concave portion are formed such that the land portion is contacted with a surface of the slave disc while the concave portion is not contacted with the slave disc, and a space defined between the surface of the slave disc and the concave portion is open to air at a circumference of the slave disc.

* * * * *